US005142503A

United States Patent [19]

[11] Patent Number: 5,142,503

[45] Date of Patent: Aug. 25, 1992

Wilcox et al.

[54] SIDE-SCANNING SONAR TOWFISH

[76] Inventors: Peter C. Wilcox, Rte. 4, Box 1685; Martin H. Wilcox, Rte. 4, Box 1691, both of Gloucester, Va. 23061

[21] Appl. No.: 765,909

[22] Filed: Sep. 24, 1991

[51] Int. Cl.[5] .................. G01S 15/00

[52] U.S. Cl. .................. 367/88

[58] Field of Search .................. 367/88, 106; 114/244

[56] References Cited

U.S. PATENT DOCUMENTS

| | | | |
|---|---|---|---|
| 3,866,711 | 2/1975 | Folds | 367/150 |
| 4,088,978 | 5/1978 | Gilmour | 367/88 |
| 4,538,250 | 8/1985 | De Metz et al. | 367/154 |
| 4,658,750 | 4/1987 | Malcosky | 367/106 |
| 4,764,905 | 8/1988 | Granz et al. | 367/140 |
| 4,802,148 | 1/1989 | Gilmour | 367/88 |

*Primary Examiner*—Daniel T. Pihulic
*Attorney, Agent, or Firm*—Raymond L. Greene

[57] ABSTRACT

A side-scanning sonar towfish constructed from a solid polyvinyl chloride (PVC) rod is provided. The PVC rod is milled and slotted to provide recesses for electronics and transducers and slotted to provide attachment points for fins and tow rail. The entire fish is then filled and sealed with urethane thereby providing sealed solid unit. A special multi-layer acoustic matching system is bonded over the transducers to provide maximum coupling efficiency of the acoustic signal thereby allowing operation of the fish at reduced power requirements.

11 Claims, 3 Drawing Sheets

SIDE-SCANNING SONAR TOWFISH

BACKGROUND OF THE INVENTION

1. Technical Field of the Invention

The invention is related to the technical field of sonar scanning and more particularly to sonar emitters and towfish.

2. Description of Prior Art

Conventional side-scanning towfish are constructed of stainless steel cylinders which house transducers and electronics. Aluminum or steel stabilizing fins are typically attached to these cylinders along with a towing harness connection and a nose section. A variety of shortcomings arise in this conventional design. The stainless steel cylinders are expensive and require expensive machining to accommodate components, attach fins, and attach harness points. The assembly is subject to seawater leakage into the inside of the cylinder where sensitive electronic components are located. Prevention of leakage requires extensive effort in sealing the electronic components. The metal structure itself is subject to corrosion wherever dissimilar metals are used. Conventional towfish are usually powered by high-voltage (500–1000 volts) DC on the tow cable. Internal electronics use this DC to provide a higher-voltage decaying sinusoid produced by a capacitive-discharge impulse circuit. Peak-to-peak voltages on the order of 4000 volts are produced, but the resultant sound pulse (a decaying sinusoid with fast attack and slow decay) is not ideal for broad-band imaging purposes.

SUMMARY OF THE INVENTION

Accordingly, it is an object of the present invention to provide a side-scanning sonar towfish formed of low-cost, easily machined material.

It is another object of the present invention to provide a side-scanning sonar towfish that can be assembled without welding or threaded fasteners.

It is a further object of the present invention to provide a side-scanning sonar towfish that is a sealed waterproof unit.

It is yet another object of the present invention to provide a side-scanning sonar towfish that have improved sonar sensitivity.

It is yet another object of the present invention to provide a side-scanning sonar towfish that requires less operating voltage.

The invention is a side-scanning sonar towfish constructed from a solid rod of machinable plastic. In the preferred embodiment polyvinyl chloride (PVC) was used for the body. Spaces are milled in the rod to receive an electronics board, fins and two transducer sets. A stainless steel tow rail is fitted in a slot along the top of the towfish. The entire structure is filled, after insertion of components, with urethane potting compound thereby providing a sealed, waterproof, and solid-filled fish. The electronics board contains resonant drivers for the transducers. Special multi-layered matching plates augment the transducer's output by increasing the efficiency of the coupling of the sound pulse into the transmission medium. The novel construction provides a low cost, easily manufactured, leakproof towfish. The novel transducer-electronics combination allows low input voltage while producing a higher efficiency enhanced sonar output.

BRIEF DESCRIPTION OF THE DRAWINGS

The above and numerous other objects and advantages of the present invention will be more readily understood from the following detailed description and the appended drawings wherein.

DETAILED DESCRIPTION OF THE INVENTION

Figure 1:
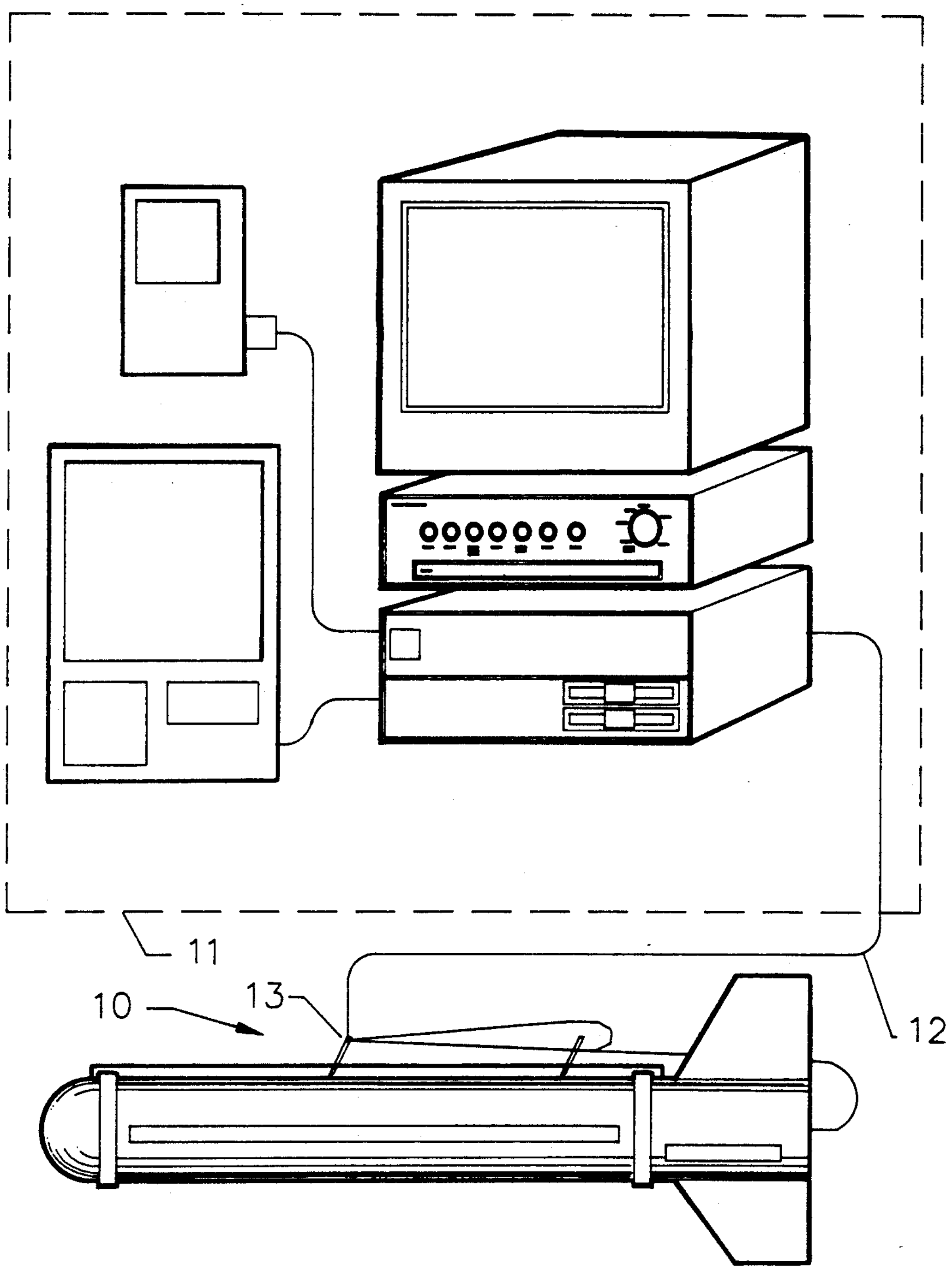
FIG. 1 is a schematic diagram of side-scanning sonar towfish connected to a representative sonar system.

Referring now to FIG. 1, the side-scanning sonar towfish of the present invention, designated generally by the reference numeral 10, is shown connected to a representative sonar system 11. The towfish 10 is connected to the sonar equipment by coaxial cable 12 which connects to a harness point 13. Cable 12 provides a low voltage, 28 volt DC, power source to towfish 10 and, multiplexed with the power source, a ping command signal to operate a transmit pulse burst generator inside the towfish. Specialized circuitry permits low voltage and power operation and as an added benefit thereby reduces the required diameter of cable 12.

Figure 2:
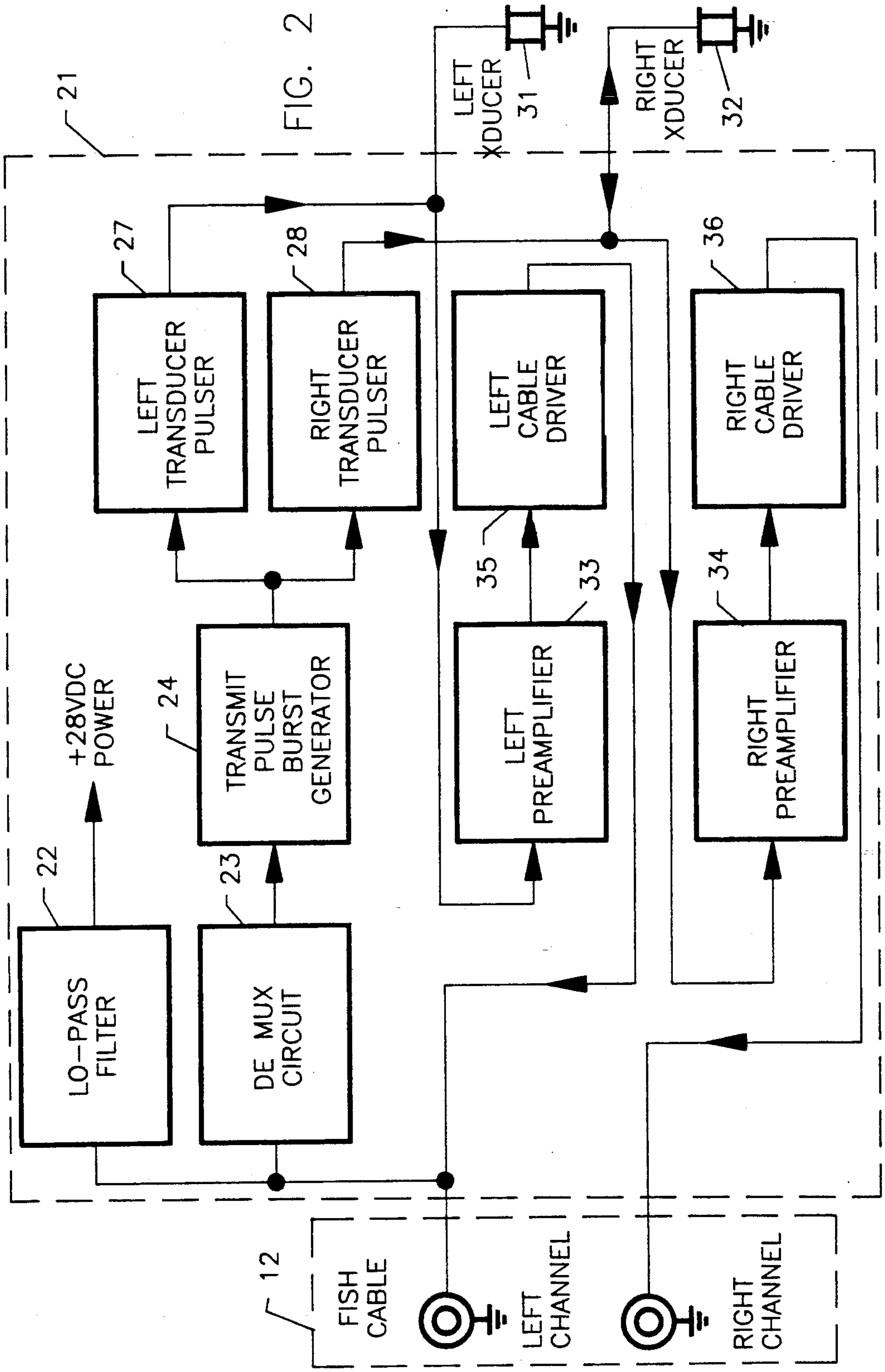
FIG. 2 is a diagram of the functional components of the towfish.

With reference now to FIG. 2, the circuitry of the towfish 10 is shown as functional elements. Coaxial cable 12 provides a data and power link to the fish and to the fish electronics unit 21. The ping command and 28 volt DC power are multiplexed on one wire and are separated in the electronics unit 21 by a low-pass filter 22 and a demultiplexer circuit 23. The demuxed signal then activates transmit pulse burst generator 24 which drives the left transducer pulser 27 and right transducer pulser 28. The transducer pulsers are resonantly-tuned pulsers which drive left transducer 31 and right transducer 32 at their resonant frequencies thereby maximizing transducer output with only 28 volts input power. Whereas conventional systems use an impulse excitation of an inductor-capacitor circuit to drive the transducer elements, this system uses resonant pulsers 27 and 28 whose frequency and burst length are controlled by a transmit pulse burst generator (TPBG) 24. The TPBG 24 produces biphasic control signals to drive the pulsers 27 and 28.

Return sonar signals are returned through left preamplifier 33 and right preamplifier 34. Left cable driver 35 and right cable driver 36 match the tow cable impedance in order that the return signals are not distorted or attenuated by the tow cable.

The circuitry of the towfish provides the capability of using a low voltage power source to produce a high quality sonar return. The generation of the pulse burst inside the towfish combined with the increased efficiency resulting from the use of the acoustic matching system provides a return sonar signal which after amplification and cable driver processing achieves resolution and clarity ordinarily associated with high voltage sonar systems.

Figure 3:
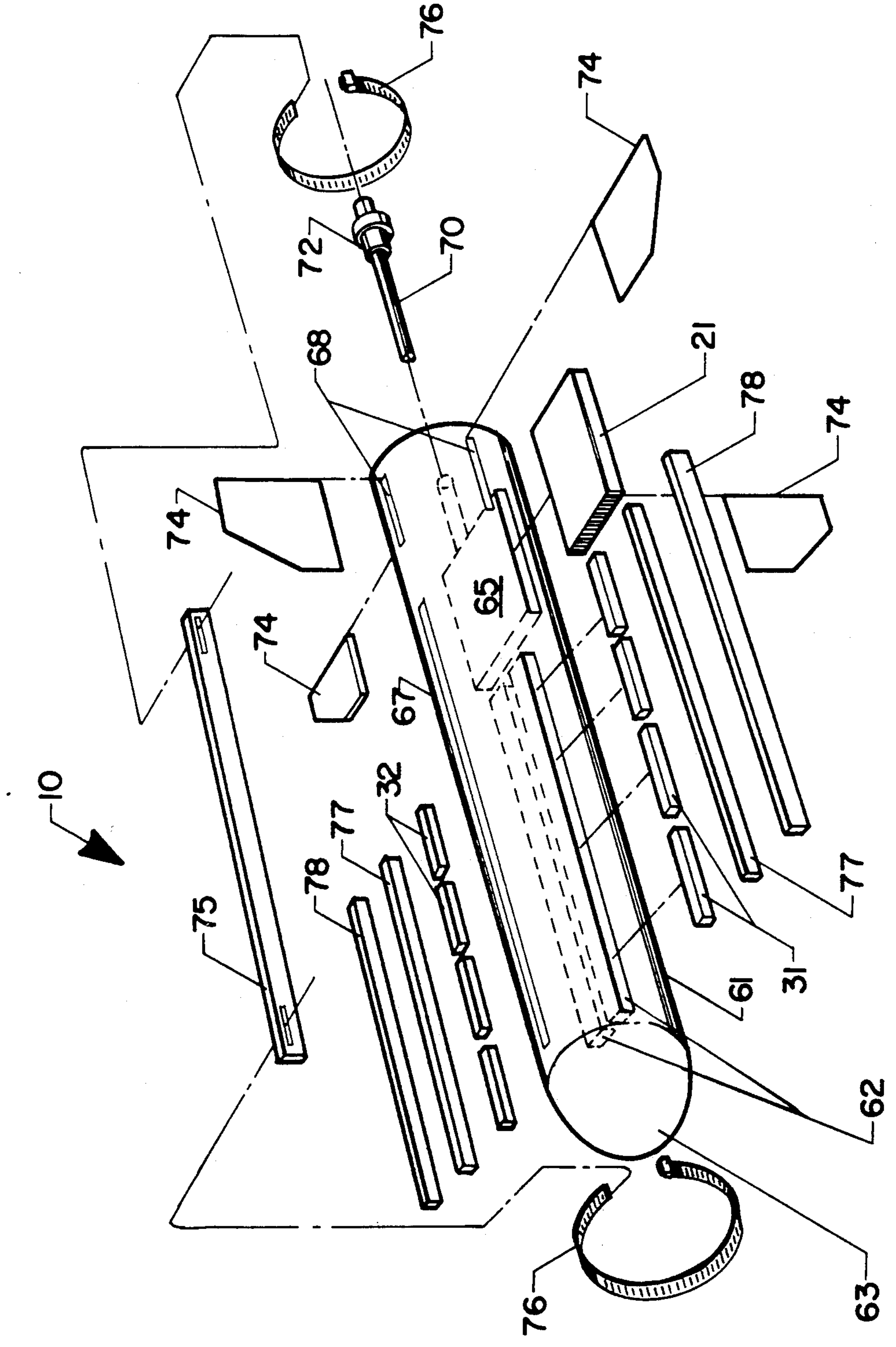
FIG. 3 is an exploded view of the towfish showing construction details.

Referring now to FIG. 3, an exploded view of the towfish is shown with the major structural and functional components. The body 61 of towfish 10 is a solid 4-inch PVC rod. Other materials, such as machinable plastic, may be used. The rounded nose 62 is milled as are the transducer recesses 63, electronics unit recess 65, and tow rail slot 67, and fin slots 68. Bore holes are then drilled between the recesses to provide a wire bus between the internal components. Construction of the towfish is accomplished by inserting a single coaxial line 70 along the bored hole connecting the recesses for the transducers, electronics unit and rear electrical connector. The electronics unit 21, transducers 31 and 32 and electrical connector 72 are inserted and attached to the connecting coaxial line 70. The entire assembly is then sealed with urethane potting compound thereby creating a solid filled sealed unit which is completely waterproof at extreme depth.

Fins 74 are machinable plastic sheet material and are bonded in place. Likewise, stainless steel tow bar 75 is bonded in place and has further reinforcement by front and rear retaining rings 76. A special acoustic matching system, consisting of an inner acoustic matching layer 77 and an outer acoustic matching layer 78, is bonded to the face of each transducer 31 and 32.

This matching system consists of multiple plates of materials which have successively lower acoustic impedance in the direction of acoustic propagation. Each plate is one-quarter wavelength thick at the resonant frequency of the transducer. The effect of the matching system is to improve the efficiency of the transducer and increase its bandwidth. Such systems are known in high-resolution high-frequency medical ultrasonic imaging systems, but are novel to commercial side-scan sonar systems. In the preferred embodiment, two layers are used, the first layer being aluminum and the second being PVC plastic.

The advantages of the present invention are numerous. The low cost material is easily milled to provide recesses for components. The entire unit is filled and sealed. There is no corrosion and no leakage. It is therefore to be understood that, within the scope of the appended claims, the invention may be practiced other than as specifically described.

What is claimed as new and desired to be secured by Letters Patent of the United States is:

1. A side-scanning sonar towfish comprising:

a machineable plastic rod milled to provide a shaped nose section and recesses for transducer sets, electronic units, electrical connector and slots for tow rail and fins;

an electronic unit inserted in a first recess in said machineable plastic rod;

means for emitting acoustic signals inserted in second and third recesses located on either side of said machineable plastic rod;

a stainless steel tow rail fitted and bonded into a slot along the top of said machineable plastic rod;

a plurality of plastic fins fitted and bonded into slots at the aft end of said machineable plastic rod; and a sealed electrical connector inserted and bonded into a recess at surface of said machineable plastic rod providing electronic connection from the towfish to a tow cable.

2. A side-scanning sonar towfish as in claim 1 wherein said plastic rod is polyvinyl chloride (PVC) rod.

3. A side-scanning sonar towfish as in claim 1 wherein said electronics unit provides a low-pass filter for isolating operating power and de-multiplexer circuit for isolating ping command data.

4. An electronics unit as in claim 3 further providing a transmit pulse burst generator and thereafter providing a dual channel transducer driver/receiver circuit.

5. An electronics unit as in claim 4 wherein said dual channel transducer driver/receiver circuit comprises a left and right channel having a resonant transducer pulse directing a signal to a transducer and a preamplifier for receiving a return signal from a transducer and a cable driver for transmitting the preamplifier signal through the towfish cable.

6. A side scanning sonar towfish as in claim 1 wherein said means for emitting acoustic signals are a pair of transducer sets.

7. A means for emitting acoustic signals as in claim 6 wherein said pair of transducer sets are covered with a multi-layered acoustic matching system bonded to each transducer.

8. A multiple layered acoustic matching system as in claim 7 having an inner acoustic matching layer adjacent to the transducer and an outer acoustic matching layer between the inner layer and the water and having the inner layer adjacent to the transducer is fabricated of aluminum.

9. A multi-layered acoustic matching system as in claim 8 wherein the outer layer is fabricated of polyvinyl chloride.

10. An inner acoustic matching layer as in claim 8 wherein said layer is sized to provide a thickness equal to one-quarter wavelength of the transducer emitted acoustic signal.

11. An outer acoustic matching layer as in claim 8 wherein said layer is sized to provide a thickness equal to one-quarter of the wavelength of the acoustic signal transmitted by the transducer-inner layer combination and bonded to said inner layer.

* * * * *